May 15, 1956
E. F. CARLSTON ET AL
2,745,872
ISOPHTHALIC ACID AND TEREPHTHALIC ACID SEPARATION
Filed Dec. 24, 1952
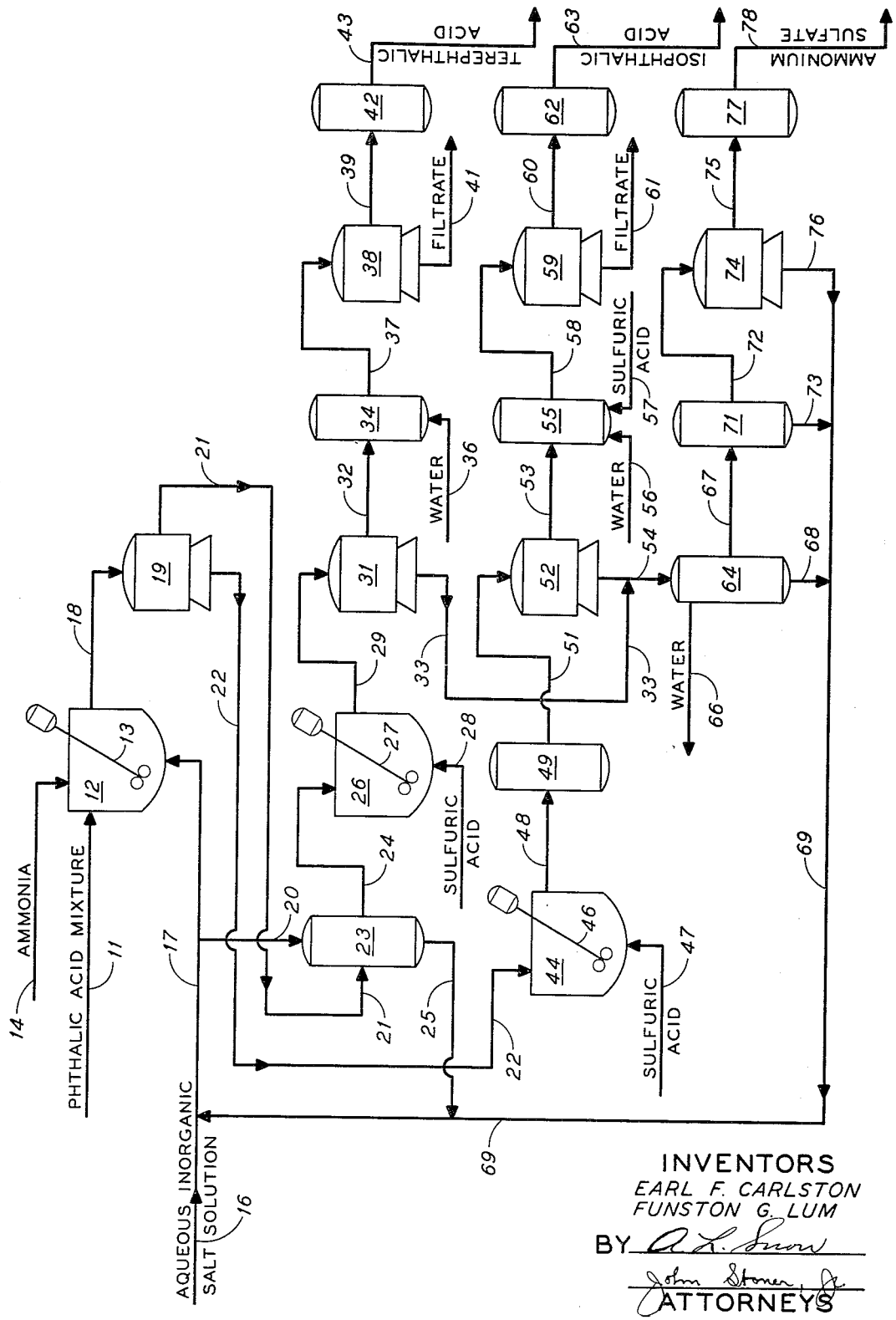
INVENTORS
EARL F. CARLSTON
FUNSTON G. LUM
BY
ATTORNEYS

2,745,872
ISOPHTHALIC ACID AND TEREPHTHALIC ACID SEPARATION

Earl F. Carlston and Funston G. Lum, Richmond, Calif., assignors to California Research Corporation, San Francisco, Calif., a corporation of Delaware Application December 24, 1952, Serial No. 327,762

11 Claims. (Cl. 260—525)

The present invention relates to a method of separating mixtures of isophthalic acid and terephthalic acid.

This application is a continuation-in-part of our copending application, Serial No. 295,818, filed June 26, 1952, now Patent No. 2,697,723.

Isophthalic acid and terephthalic acid are commonly prepared by the oxidation of meta- and para-xylenes. These isomeric xylenes are exceedingly difficult to separate by conventional methods due to the close similarity of their physical properties. Separation of the mixed isophthalic and terephthalic acids produced by oxidation of isomeric mixtures of meta- and para-xylenes has therefore been suggested as an alternative. Unfortunately, however, the separation of mixtures of isophthalic and terephthalic acids is not without its problems. Conventional methods of separation such as fractional distillation, as applied to mixtures of these acids, are impractical since terephthalic acid and isophthalic acid have such high melting points.

It has now been discovered that mixtures of alkali metal salts of terephthalic acid and isophthalic acid can be effectively separated by forming an intimate mixture of the salts with a concentrated aqueous solution of an inorganic alkali metal salt, said aqueous solution being insufficient to dissolve all of the mixed alkali metal phthalic acid salts, and separating a solid phase and a liquid phase from the mixture.

By the process according to this invention it is possible to separate isomeric mixtures of isophthalic acid and terephthalic acid into essentially pure isophthalic acid and terephthalic acid. The acids are converted to their alkali metal salts by conventional means known to the art as hereinafter disclosed. Upon intimately mixing the alkali metal isophthalate and alkali metal terephthalate mixture with concentrated aqueous inorganic alkali metal salt solutions insufficient to dissolve all of the alkali metal phthalate mixture and separating a solid phase and a liquid phase, essentially pure alkali metal isophthalate or essentially pure alkali terephthalate, or both, are obtained. When the concentrated aqueous solution of inorganic alkali metal salt is not only insufficient to dissolve all of the alkali metal phthalate mixture, but also insufficient to dissolve all of the more soluble alkali metal isophthalate, the liquid phase consists of essentially pure alkali metal isophthalate in aqueous solution saturated with the inorganic alkali metal salt and alkali metal isophthalate. When the concentrated aqueous solution of inorganic alkali metal salt is employed in an amount insufficient to dissolve all of the alkali metal phthalate mixture, but sufficient to dissolve all of the alkali metal isophthalate as well as part of the alkali metal terephthalate, the solid phase consists of essentially pure alkali metal terephthalate. When the concentrated aqueous solution of inorganic alkali metal salt is insufficient to dissolve all of the alkali metal phthalate mixture, but just sufficient to dissolve all of the alkali metal isophthalate, a substantially complete separation of the alkali metal isophthalate and alkali metal terephthalate results.

It is also possible in accordance with the practice of this invention to effect a substantially complete separation of the alkali metal isophthalate and alkali metal terephthalate mixture by adding an inorganic alkali metal salt to a complete aqueous solution of the alkali metal isophthalate and alkali metal terephthalate mixture. Sufficient water is added to the mixture of alkali metal isophthalate and alkali metal terephthalate to completely dissolve the salts and then an inorganic alkali metal salt is added with stirring in an amount just sufficient to form a solution saturated with the inorganic alkali metal salt and all of the alkali metal isophthalate present in the phthalate mixture. A solid phase and a liquid phase are separated, the solid phase consisting of essentially pure alkali metal terephthalate and the liquid phase consisting of essentially pure alkali metal isophthalate in aqueous inorganic alkali metal salt solution.

The separation according to the process of this invention is adaptable to mixtures of any alkali metal salts of isophthalic acid and terephthalic acid. For practical reasons it is preferred that the alkali metal of the phthalate mixture and that of the inorganic salt are the same in order to avoid mixtures of the alkali metals in the by-products of the process.

The process of separating isophthalic and terephthalic acids in the form of their alkali metal salts is also applicable to mixtures of isophthalic and terephthalic acids containing orthophthalic acid, benzoic acid, toluic acids, etc. such as may be obtained by the oxidation of natural crude xylenes. No change in the process of separation is required because of these other soluble organic acids. The separated alkali metal isophthalate and inorganic salt solution and the alkali metal terephthalate cake are merely acidified with mineral acid to liberate the isophthalic and terephthalic acids as solids. The solid isophthalic acid and solid terephthalic acid are then washed with water, whereupon the more soluble organic acids are removed in the water washes.

The term "alkali metal salt" as used throughout the specification and claims includes ammonium salts as well as salts of the true alkali metals such as sodium and potassium.

The alkali metal salts of isophthalic and terephthalic acid, as mentioned before, may be prepared from the acids or their various derivatives according to conventional methods. They may be prepared directly from the isophthalic and terephthalic acids by neutralization with sodium hydroxide, potassium hydroxide, ammonium hydroxide, etc. Dialkyl esters of the acids and lower alkyl alcohols may be converted by saponification with a slight excess of aqueous sodium hydroxide, potassium hydroxide, etc. Acid-amide mixtures of the isophthalic and terephthalic acid made by oxidation of mixtures of meta- and para-xylene, according to the process of U. S. Patent No. 2,610,980 to Naylor, are convertible to the alkali metal salts by caustic hydrolysis with aqueous sodium hydroxide or potassium hydroxide.

The salts of the concentrated aqueous solution may be any of the chlorides, sulfates or carbonates of the alkali metals such as sodium, potassium, or ammonium. For present purposes ammonium sulfate is preferred in the process because of its commercial value as a by-product and its particular suitability in the separation of ammonium isophthalate and ammonium terephthalate. The concentration of inorganic alkali metal salt in the aqueous salt solution may vary widely. Concentrated or nearly saturated salt solutions are preferred, since they may be employed without the necessity of accurate control of temperature and washing rates in the separations.

As already stated, the amount of concentrated aqueous solution of inorganic alkali metal salt employed in separating the alkali metal isophthalate and alkali metal terephthalate mixtures may be any amount insufficient to dissolve all of the salts when the mixture has been brought into equilibrium, as by intimate mixing of the solid and liquid phases. The amount of aqueous salt solution of any particular inorganic alkali metal salt in any given concentration which is just sufficient to entirely dissolve the alkali metal isophthalate may be simply determined. Measured amounts of the alkali metal isophthalate are added to the aqueous inorganic alkali metal salt solution at the desired temperature of operation until the solution has become saturated with respect to the inorganic alkali metal salt and alkali metal salt and begins to form a solid phase. From such measurements the amount of concentrated aqueous salt solution required to just dissolve all of the alkali metal isophthalate may be readily calculated.

Separations of mixtures of alkali metal isophthalate and alkali metal terephthalate may be carried out at any practical temperature. Room temperatures such as about 25° C. are particularly convenient, since they require neither heating nor cooling. Very effective separations may also be accomplished at higher temperatures, even exceeding the boiling point of the concentrated aqueous solutions when superatmospheric pressures are employed.

The solid phase and the liquid phase formed in the process according to this invention are conveniently separated by any of the commonly known methods for separating solids from liquids. Such methods include sedimentation as in the case of continuous rotating thickeners, centrifuges, and the like. For present purposes filtration with vacuum or centrifuge has been found a very practical means of separation. Decantation may be resorted to when complete phase separation is not required as, for example, when mere enrichment of the terephthalate over the proportion present in the original mixture is desired.

The solid phase separated by sedimentation, filtration, etc. from the intimate mixture of aqueous inorganic alkali metal salt solution and the alkali metal isophthalate and alkali metal terephthalate mixture contains the alkali metal terephthalate in enriched proportions. Mother liquor adhering to the solid phase precipitate or filter cake may contain alkali metal isophthalate or certain amounts of alkali metal isophthalate may be present in the solid phase. The alkali metal terephthalate, if desired, may be purified of such alkali metal isophthalate by repeated washing of the solid phase precipitate or filter cake with concentrated aqueous solutions of inorganic alkali metal salts.

In addition to the use of concentrated solutions of inorganic alkali metal salts as washing liquids, it is also possible to use water alone as a wash liquid. The use of water, however, may require an efficient countercurrent washing system with careful control of temperature and washing rates as well as frequent inspection of the filtrate obtained.

The invention may be further illustrated by reference to the accompanying drawing which shows a separation of isophthalic and terephthalic acid mixtures by way of their ammonium salts. The mixture of phthalic acids to be separated is introduced via line 11 to vessel 12 equipped with agitating means 13. Sufficient ammonia to convert the phthalic acids to their ammonium salts is added through line 14. In situations where the ammonium salts of the mixed phthalic acids are available at the start, the addition of ammonia via line 14 is, of course, unnecessary. Concentrated aqueous ammonium sulfate solution insufficient to entirely dissolve the mixed ammonium phthalates is introduced through lines 16 and 17 to vessel 12 where the ammonium sulfate solution and mixed ammonium phthalates are agitated to produce an intimate mixture. If desired, the same effect may be accomplished by first adding sufficient water to dissolve the ammonium phthalate and then adding solid ammonium sulfate. In either case the resulting intimate mixture is withdrawn via line 18 to centrifuge 19 where the solid and liquid phases are separated.

The solid phase containing the ammonium terephthalate is removed from centrifuge 19 via line 21 to washer 23 where it is washed with aqueous ammonium sulfate solution introduced through line 20 from supply lines 16 and 17. Used wash solution is conveyed via line 25 to return line 69. The washed solid phase is removed via line 24 to vessel 26 equipped with agitator 27. Sulfuric acid sufficient to spring the phthalic acid is added from line 28 and the mixture brought into intimate contact by agitation. The resulting slurry of ammonium sulfate, excess sulfuric acid and terephthalic acid is withdrawn via line 29 to centrifuge 31. There the solid terephthalic acid is separated and removed through line 32 and the liquid phase containing ammonium sulfate and excess sulfuric acid is removed through line 33. From line 32 the terephthalic acid is introduced to vessel 34 where it is mixed with water from line 36. The mixture of acid and water is then transferred by line 37 to centrifuge 38, from which the separated solid terephthalic acid is removed via line 39 and aqueous filtrate is removed via line 41. The solid terephthalic acid is then conducted through line 39 to drier 42 from which the dry terephthalic acid product is withdrawn at line 43.

The liquid phase from centrifuge 19 is taken via line 22 to vessel 44 equipped with stirrer 46. Sufficient sulfuric acid to spring the phthalic acid from the ammonium phthalate in the solution is added via line 47. The resulting solid phase containing isophthalic acid and liquid phase containing ammonium sulfate and excess sulfuric acid are intimately mixed and withdrawn via line 48 to evaporative cooler 49. From cooler 49 the mixture is conducted through line 51 to centrifuge 52. The liquid phase containing ammonium sulfate is withdrawn via line 54. From line 53 the solid isophthalic acid is introduced to vessel 55 where it is mixed with water from line 56 and sulfuric acid from line 57. The digested isophthalic acid mixture is then withdrawn via line 58 to centrifuge 59 where the solid isophthalic acid is separated and removed via line 60 and the liquid phase filtrate containing sulfuric acid is withdrawn via line 61. From line 60 the isophthalic acid is introduced to drier 62 from which the dried isophthalic acid product is withdrawn via line 63.

The aqueous ammonium sulfate solutions from lines 33 and 54 are introduced to evaporator 64. Water is removed as vapor via line 66 and the concentrated aqueous ammonium sulfate solution withdrawn via line 67. A portion of the concentrated ammonium sulfate solution, if desired, may be withdrawn from evaporator 64 via line 68 and returned directly through line 69 to the separation process. Concentrated ammonium sulfate solution from line 67 is introduced to crystallizer 71 where crystals of ammonium sulfate are formed. Crystallized ammonium sulfate is then withdrawn via line 72. If desired, a portion of the ammonium sulfate mother liquor may be withdrawn from crystallizer 71 via line 73 and returned to the separation through line 69. From line 72 the crystallized ammonium sulfate mixture is introduced to centrifuge 74, from which solid ammonium sulfate crystals separated are withdrawn via line 75. Ammonium sulfate mother liquor is withdrawn via line 76 and returned via line 69 to the separation process. The ammonium sulfate crystals from line 75 are conveyed to drier 77 from which they are withdrawn as essentially pure dry ammonium sulfate at line 78.

Although it is believed that the practice of the present invention will be clear to one skilled in the art from the foregoing discussions, the following simplified examples are offered as further illustrations. Unless otherwise specified the proportions given are on a weight basis and the various separations are carried at room temperatures.

Example 1

73.5 parts of isophthalic acid and 26.5 parts of terephthalic acid were dissolved in sodium hydroxide solution to complete neutralization of the acids. After filtration to remove insoluble impurities, the solution was boiled until a slurry of precipitated sodium salt was formed. Additional water was removed by boiling until the weight of water in the slurry was 53% of the total weight. The slurry was then filtered on a vacuum filter to remove as much of the mother liquor as possible.

The moist cake consisting of sodium terephthalate and sodium isophthalate was slurried with saturated sodium chloride solution and filtered on a vacuum filter to remove all of the mother liquor possible. This operation was repeated until the filtrate showed no isophthalate.

The filter cake was dissolved in water, and hydrochloric acid was added. The terephthalic acid was filtered and the cake washed with water until the filtrate was free of hydrochloric acid and sodium chloride. Substantially complete recovery of the terephthalic acid in the original solution was obtained.

All of these sodium isophthalate solution filtrates and all of the sodium chloride wash solution filtrates from the above operations were combined and acidified with hydrochloric acid and filtered. After repeatedly washing with water to remove all of the hydrochloric acid and sodium chloride, substantially complete recovery of the isophthalic acid in the original solution was obtained.

Example 2

95 parts of a mixture of isophthalic acid and terephthalic acid containing approximately 70% isophthalic acid and 30% terephthalic acid by spectroscopic analysis were dissolved in a solution of 389 parts water and 116 parts of approximately 40% sodium hydroxide solution. 130 parts of dry sodium chloride were added. After the sodium chloride was dissolved and the sodium terephthalate was precipitated, the slurry was filtered.

The filter cake was washed several times with a saturated sodium chloride solution to remove mother liquor containing sodium isophthalate, until the filtrate showed no isophthalic acid. The sodium terephthalate filter cake was then dissolved in water and the solution filtered. The solution was heated to boiling and the terephthalic acid was precipitated by adding hydrochloric acid in excess. The precipitated terephthalic acid was filtered and washed repeatedly with water until the filtrate was free of hydrochloric acid and sodium chloride. Substantially complete recovery of the terephthalic acid in the original solution was obtained.

All of the sodium isophthalate solution filtrate and all of the sodium chloride wash solution filtrates were combined and acidified with hydrochloric acid. After repeatedly washing with water to remove all of the hydrocholoric acid and sodium chloride, substantially complete recovery of the isophthalic acid in the original solution was obtained.

Example 3

166 parts of a mixture of isophthalic acid and terephthalic acid containing approximately 75% isophthalic acid and 25% terephthalic acid by spectroscopic analysis were dissolved in a solution of 1052 parts of water and 122 parts of ammonium hydroxide containing 35 parts of $NH_3$. 710 parts of dry ammonium sulfate were added. After the ammonium sulfate was dissolved the ammonium terephthalate precipitated and the resulting slurry was filtered at room temperature. The filter cake was washed several times with a saturated ammonium sulfate solution to remove mother liquor containing ammonium isophthalate, until the filtrate showed no isophthalic acid.

The ammonium terephthalate filter cake was dissolved in water and the solution filtered. The solution was heated to boiling and the terephthalic acid was precipitated by adding hydrochloric acid in excess. The precipitated terephthalic acid was filtered off and washed repeatedly with water until the filtrate was free of hydrochloric acid, ammonium chloride, and ammonium sulfate. Substantially complete recovery of the terephthalic acid in the original solution was obtained.

All of the ammonium isophthalate solution filtrate and all of the ammonium sulfate wash solution filtrates obtained above were combined and acidified with hydrochloric acid. The resulting slurry was then filtered. After repeatedly washing the filter cake with water to remove all of the hydrochloric acid, ammonium chloride, and ammonium sulfate, substantially complete recovery of the isophthalic acid in the original solution was obtained.

Example 4

80 pounds of a mixture of isophthalic and terephthalic acid containing approximately 85% isophthalic acid and 15% terephthalic acid by spectroscopic analysis were placed in a 50 gallon kettle together with 218 pounds of water, 200 pounds of ammonium sulfate, and 85 pounds of aqueous ammonium hydroxide containing about 24 pounds of $NH_3$, added in the above order. The mixture was held at 200° F. and stirred vigorously for 1½ hours. Ammonium hydroxide was added periodically to maintain the slurry at a pH of 8. A total of 3½ gallons of ammonium hydroxide was used for this purpose. The slurry was filtered at room temperature to give an ammonium terephthalate filter cake.

The ammonium terephthalate cake obtained above was slurried with 276 pounds of saturated ammonium sulfate solution at a temperature of 180° F. The slurry was cooled to room temperature and adjusted to a pH of 8 and filtered. This slurrying and filtering operation was repeated. The final filter cake was given a wash of 100 pounds of saturated ammonium isophthalate solution.

The filter cake of ammonium terephthalate from above was dissolved in water and the solution then filtered. The solution was then heated and hydrochloric acid was added in excess of the amount necessary to spring the terephthalic acid. The terephthalic acid thus precipitated was filtered and the filter cake washed several times with water until the filtrate showed no hydrochloric acid, ammonium chloride or ammonium sulfate. The terephthalic acid in the original solution was substantially completely recovered in the separation process.

The ammonium isophthalate solution filtrates and the ammonium sulfate wash solution filtrates obtained in the filtrations described above were combined and acidified with hydrochloric acid. The resulting slurry of isophthalic acid was filtered and the filter cake washed several times with water to remove all of the hydrochloric acid, ammonium chloride and ammonium sulfate. Substantially all of the isophthalic acid in the original solution was recovered.

We claim:

1. A process for separating mixtures of an alkali metal salt of isophthalic acid and the same alkali metal salt of terephthalic acid which comprises forming an intimate mixture of the salts with a concentrated aqueous solution of an inorganic salt of the same alkali metal, said inorganic salt being selected from the group consisting of alkali metal chlorides, sulfates and carbonates, and said aqueous solution being insufficient to dissolve all of the mixed alkali metal phthalates and separating a solid phase and a liquid phase from the intimate mixture.

2. A process for separating mixtures of ammonium isophthalate and ammonium terephthalate which comprises forming an intimate mixture of the ammonium phthalates with a concentrated aqueous solution of an inorganic ammonium salt selected from the group consisting of ammonium chloride, ammonium sulfate and ammonium carbonate, said aqueous solution being insufficient to dissolve all of the ammonium phthalates and separating a solid phase and a liquid phase from the intimate mixture.

3. A process for separating mixtures of sodium isophthalate and sodium terephthalate which comprises forming an intimate mixture of the sodium phthalates with a concentrated aqueous solution of an inorganic sodium salt selected from the group consisting of sodium chloride, sodium sulfate and sodium carbonate, said aqueous solution being insufficient to dissolve all of the sodium phthalates and separating a solid phase and a liquid phase from the intimate mixture.

4. A process for separating mixtures of ammonium isophthalate and ammonium terephthalate which comprises forming an intimate mixture of the ammonium phthalates with a concentrated aqueous solution of an inorganic ammonium salt selected from the group consisting of ammonium chloride, ammonium sulfate and ammonium carbonate, said aqueous solution being insufficient to dissolve all of the ammonium phthalates, but at least sufficient to dissolve all of the ammonium isophthalate and separating a solid phase and a liquid phase from the intimate mixture, said solid phase being substantially pure ammonium terephthalate.

5. A process for separating mixtures of ammonium isophthalate and ammonium terephthalate which comprises forming an intimate mixture of the ammonium phthalates with a concentrated aqueous solution of an inorganic ammonium salt selected from the group consisting of ammonium chloride, ammonium sulfate and ammonium carbonate, said aqueous solution being insufficient to dissolve all of the ammonium isophthalate and separating a solid phase and a liquid phase from the intimate mixture, said liquid phase being an aqueous inorganic ammonium salt solution of substantially pure ammonium isophthalate.

6. A process for separating mixtures of ammonium isophthalate and ammonium terephthalate which comprises forming an intimate mixture of the ammonium phthalates with a concentrated aqueous solution of an inorganic ammonium salt selected from the group consisting of ammonium chloride, ammonium sulfate and ammonium carbonate, said aqueous solution being sufficient to form a saturated solution with all of the ammonium isophthalate present and separating a solid phase and a liquid phase from the intimate mixture, said solid phase being substantially pure ammonium terephthalate and said liquid phase being an aqueous inorganic ammonium salt solution of substantially pure ammonium isophthalate.

7. A process for separating mixtures of ammonium isophthalate and ammonium terephthalate which comprises forming a concentrated solution of said mixtures in water, adding an inorganic ammonium salt in amount sufficient to form a solid phase and a liquid phase and separating said solid phase and said liquid phase, said inorganic ammonium salt being selected from the group consisting of ammonium chloride, ammonium sulfate and ammonium carbonate.

8. A process for separating mixtures of ammonium isophthalate and ammonium terephthalate which comprises forming an intimate mixture of the phthalates with a concentrated aqueous solution of an inorganic ammonium salt, said inorganic ammonium salt being selected from the group consisting of ammonium chloride, ammonium sulfate, ammonium carbonate, and said aqueous solution being sufficient to form a saturated solution with all of the ammonium isophthalate present, separating a solid phase and a liquid phase from the intimate mixture and washing the solid phase with a concentrated aqueous inorganic ammonium salt solution.

9. A process as in claim 8 wherein the inorganic ammonium salt is ammonium sulfate.

10. A process for separating mixtures of isophthalic acid and terephthalic acid which comprises forming an intimate mixture of an alkali metal salt thereof with a concentrated aqueous solution of an inorganic salt of the same alkali metal, said inorganic salt being selected from the group consisting of alkali metal chlorides, sulfates and carbonates, said aqueous solution being sufficient to form a saturated solution with all of the alkali metal isophthalate present, separating a solid phase and a liquid phase from the intimate mixture, said solid phase being substantially pure alkali metal terephthalate and said liquid phase being an aqueous alkali metal salt solution of substantially pure alkali metal isophthalate and reconverting the separated alkali metal terephthalate and alkali metal isophthalate phases to phthalic acids by acidification with mineral acid.

11. A process for separating terephthalic acid from mixtures of isophthalic and terephthalic acid which comprises forming a concentrated solution of the ammonium salts thereof in water, adding sufficient ammonium sulfate to form a solid phase and a liquid phase, separating said solid phase and said liquid phase, washing the solid phase with a saturated aqueous solution of ammonium sulfate until the washed solution shows no isophthalic acid, dissolving the washed solid phase in water and adding an excess of mineral acid to the solution to precipitate the terephthalic acid in substantially pure form.

References Cited in the file of this patent

UNITED STATES PATENTS 2,697,723     Carlston et al.  ---------- Dec. 21, 1954

OTHER REFERENCES

Beilstein: Liebigs Ann., vol. 133, pg. 42 (1865).
Hell et al.: Ber. Deut. Chem., vol. 22, pg. 508 (1889).
Weitz: Z. Electrochem., vol. 31, pg. 546 (1912).
MacArdle: "Solvents in Synthetic Org. Chem.," Van Nostrand, pgs. 158–167 (1925).
Weitz et al.: Ber. Deut. Chem., vol. 61, pgs. 1144–6 (1928).